Feb. 28, 1933.   F. Y. PEARNE ET AL   1,899,881
POT FORMING MACHINE
Filed Feb. 6, 1931   3 Sheets-Sheet 2
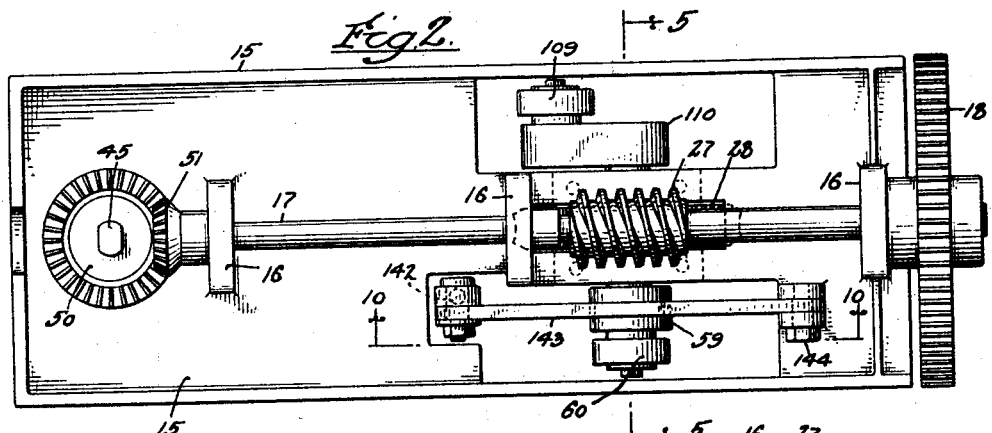
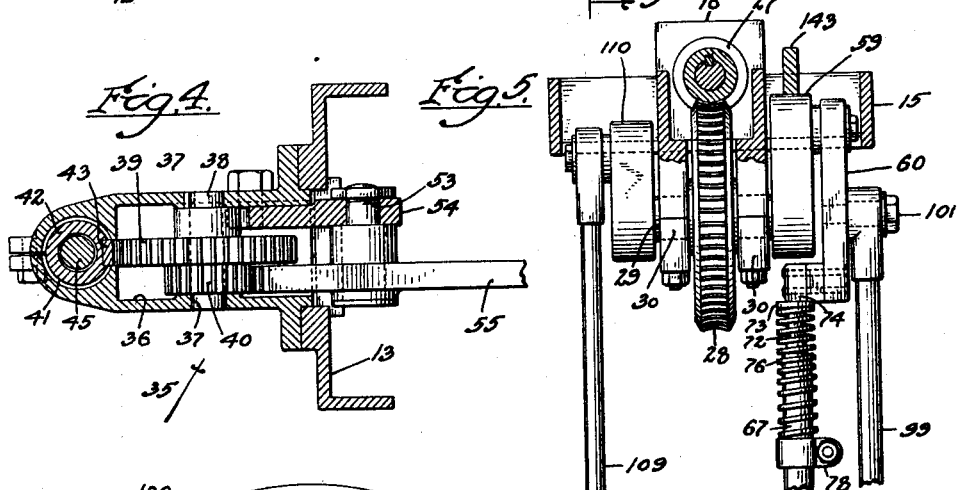
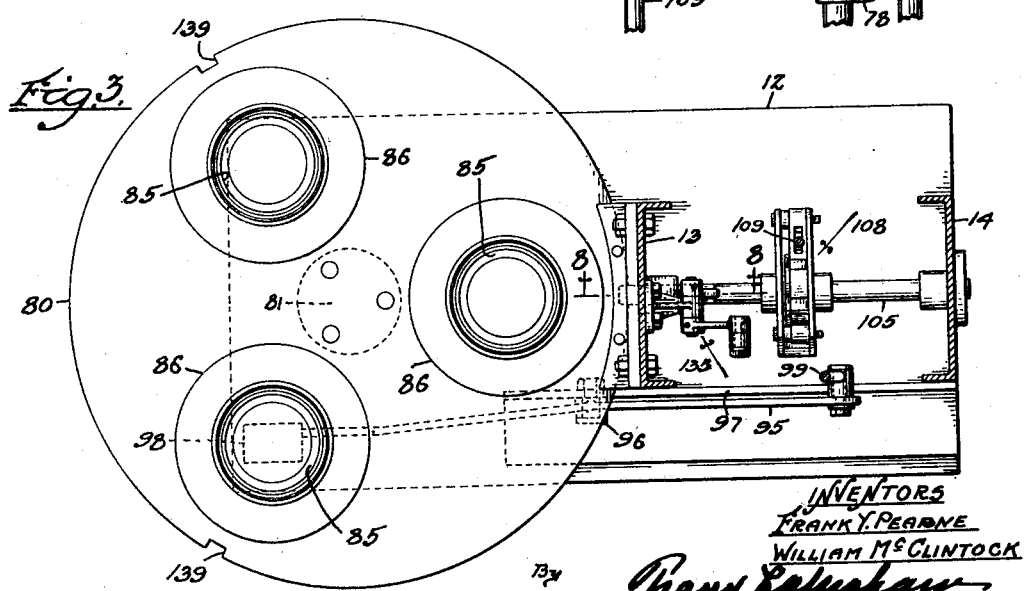
INVENTORS
FRANK Y. PEARNE
WILLIAM McCLINTOCK
BY
ATTORNEY

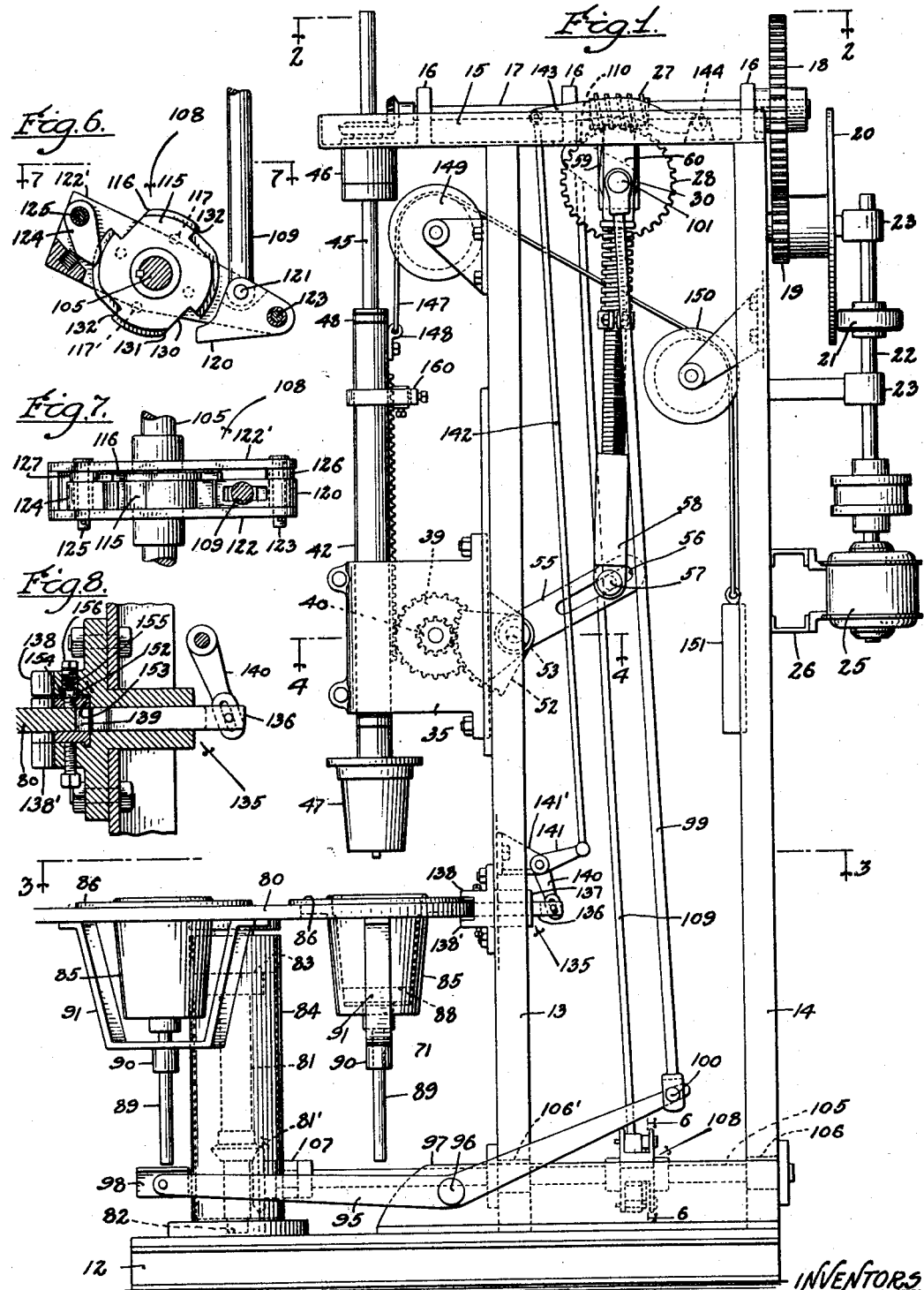

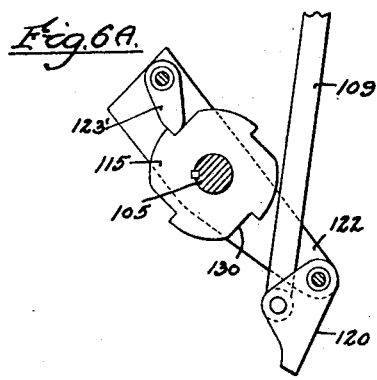
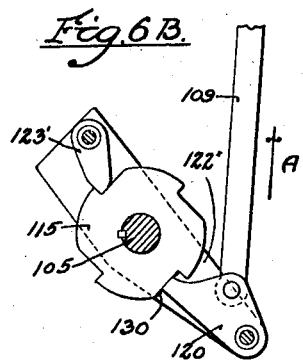
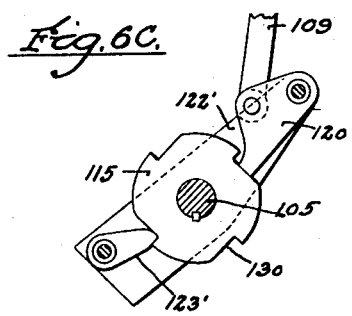
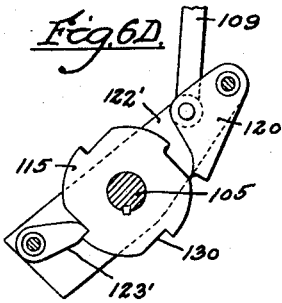
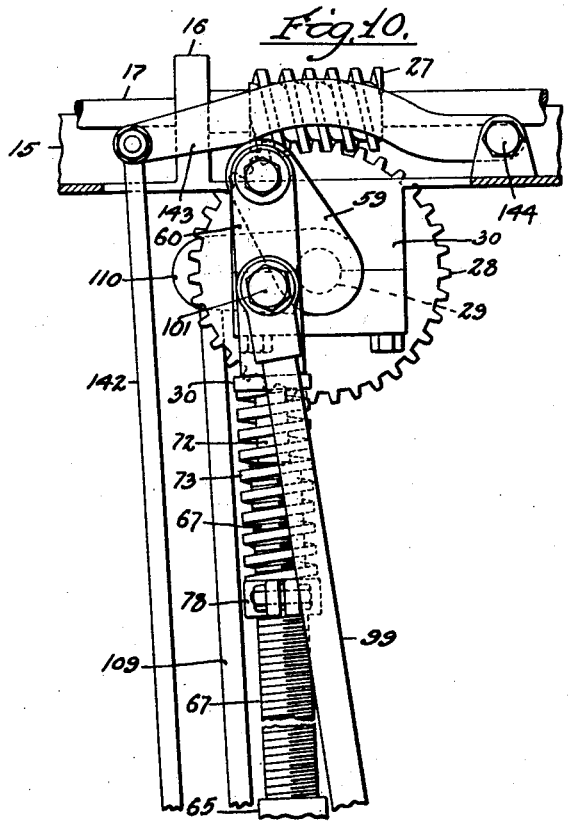
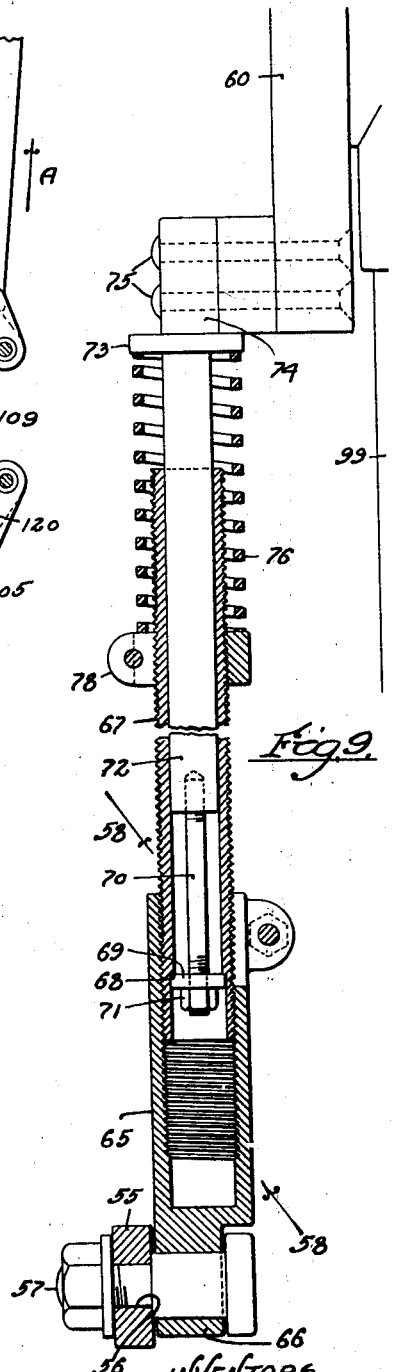
INVENTORS
FRANK Y. PEARNE
WILLIAM McCLINTOCK
ATTORNEY Patented Feb. 28, 1933

1,899,881

UNITED STATES PATENT OFFICE

FRANK Y. PEARNE, OF ALHAMBRA, AND WILLIAM McCLINTOCK, OF LOS ANGELES, CALIFORNIA, ASSIGNORS OF ONE-THIRD TO FRANK R. GALBREATH, OF LOS ANGELES, CALIFORNIA

POT FORMING MACHINE

Application filed February 6, 1931. Serial No. 513,880.

This invention has to do in a general way with the art of molding clay, and is more particularly related to machines for molding articles such as flower pots and the like, having as a primary object the production of a machine of the class described which is of simple form and construction and is entirely automatic in its operation.

It is a noteworthy feature of the machine contemplated by this invention, that the only manual operation necessary in the molding of an article consists of placing a ball of clay in a mold, the remaining operations of forcing a core into the mold and extracting the formed article being automatically carried out by the machine. It is entirely possible, of course, that the clay might be apportioned and delivered to the machine automatically, but mechanism for carrying out this operation forms no part of the present invention.

The general construction of the machine contemplated by our invention comprises a rotary table which is equipped with means for imparting intermittent rotation thereto, a vertical reciprocating core member, and an extracting member. The core member and the table rotating mechanism are so timed and so correlated that the table is rotated only at such times as the core is positioned thereabove. In order that the table may be held in the position in which one of the molds therein is in exact alignment with the core, we provide the machine with a locking mechanism adapted to engage the table when it reaches such a position, and for the purpose of releasing the table when the core has been elevated to a position at which the table can be rotated, we provide releasing means for disengaging the lock, such means in this form of our invention being operated by the same mechanism which imparts reciprocation to the core. The rotary table is provided with a plurality of molds, such molds being equipped with extracting means and arranged so that one of the molds is positioned above an extracting arm or lever when another of the molds is situated below the core.

It is necessary in the construction of a machine of this character, that all of the parts be correlated so that the operation takes place at the proper time. In order to effect this result in the most satisfactory manner, we have constructed the machine so that all of the operative parts are controlled from a single source of power.

It is sometimes necessary, in working upon clays of various textures, to act upon the clay in the mold more than once with the core. We have, therefore, devised a novel type of table rotating means which may be optionally set so as to permit the core entering the mold a plurality of times prior to the movement of the table.

For the most satisfactory results in the molding of clay articles of the type referred to above, it is important that the core member be rotated during its entrance into the mold. We have, therefore, produced a core operating mechanism which is constructed so that the core receives reciprocating and rotating motion at the same time.

The details in the construction of a preferred form of our invention, together with other objects attending its production, will be best understood from the following description of the accompanying drawings which are chosen for illustrative purposes only, and in which Fig. 1 is an elevational view showing a preferred embodiment of our invention;

Fig. 2 is a plan view which may be considered as having been taken in a plane represented by the line 2—2 in Fig. 1;

Fig. 3 is a plan section taken in a plane represented by the line 3—3 in Fig. 1;

Fig. 4 is a partial plan section taken in a plane represented by the line 4—4 in Fig. 1;

Fig. 5 is a partial sectional elevation taken in a plane represented by the line 5—5 in Fig. 2;

Fig. 6 is a sectional elevation illustrating the details in the construction of a preferred form of table ratcheting organization and may be considered as having been taken in a plane represented by the line 6—6 in Fig. 1;

Fig. 7 is a plan view of the table ratcheting organization and may be considered as having been taken in a plane represented by the line 7—7 in Fig. 6;

Fig. 8 is a sectional elevation taken through the table locking organization and may be considered as having been taken in a plane represented by the line 8—8 in Fig. 3;

Fig. 9 is a partial sectional elevation illustrating the details in the construction of a preferred form of connecting rod which is used in connection with the core reciprocating mechanism;

Fig. 10 is a partial sectional view taken in a plane represented by the line 10—10 in Fig. 2 and will be hereinafter used to illustrate the operation of the crank shaft with respect to the core reciprocating mechanism, the table ratcheting mechanism and the table lock;

Figs. 6a, 6b, 6c, and 6d are diagrammatic views illustrating the operation of the table control ratchet.

More particularly describing the invention as herein illustrated, reference numeral 11 indicates a frame consisting of a base member 12 and standards 13 and 14. The standards 13 and 14 support what we will term a top plate 15. The plate 15 carries bearings 16 which in turn support a main drive shaft 17. The outer end of the drive shaft 17 carries a gear 18 which is in mesh with the pinion 19, the pinion 19 being adapted to receive rotation from a friction disk 20. The friction disk 20 is rotated by a friction wheel 21 which is adjustably mounted upon a vertical shaft 22 carried by bearings 23 and driven by a motor 25 which is supported by a suitable bracket 26 mounted on the side of the standard 14. A worm 27 is keyed to the drive shaft 17 and is in driving engagement with the worm wheel 28, which in turn is keyed to the crank shaft 29, the latter member being mounted between suitable bearings 30.

Mounted upon the outer face of the standard 13 is what we will hereinafter refer to as a housing, indicated by reference numeral 35. The details in the construction of the housing 35 are best illustrated in Fig. 4, where it is shown as consisting of a housing section 36 which has bearing apertures 37 formed on opposite sides thereof, such apertures being adapted for the reception of a short shaft 38 which carries a racking gear 39 and a pinion 40. A longitudinal bearing passage 41 is formed in the head of the housing 35 and this passage is adapted to receive a reciprocating sleeve 42 which is provided with a rack 43 adapted to be engaged by the gear 39. The reciprocating sleeve 42 contains a rotating spindle 45, the upper end of such spindle extending through a bearing 46 formed on the end of the top plate 15 and the lower end of the spindle is provided with a core, indicated by reference numeral 47. Relative movement between the spindle and the sleeve 42 is prevented by a collar 48 which is keyed or otherwise rigidly attached to the spindle above the sleeve. The upper end portion of the spindle 45 is provided with flattened surfaces, as illustrated in Fig. 2, and extends through a correspondingly formed passage or aperture in a bevelled gear 50. The gear 50 is in mesh with a pinion 51 which is keyed to the outer end of the drive shaft 17.

The general construction described above, consisting of the sleeve 42, of a spindle 45, and core 47, will be hereinafter referred to as a core member, and it will be understood from the foregoing description that this core member comprises an organization which is adapted to be vertically reciprocated and in which the core thereof is adapted to be rotated during such reciprocation by means of the spindle 45.

For the purpose of effecting the reciprocation of the core member, we provide the machine with a crank and lever mechanism, consisting of a segmental gear 52 provided with a rigid shaft 53 adapted to be received in a bearing member 54 which is mounted on the inner surface of the standard 13. The segmental gear 52 is equipped with a lever 55, the end portion of which is provided with a slot 56 which is adapted to adjustably receive a pin 57, which in turn is connected with the lower end portion of a sectional connecting member 58. The upper end portion of the connecting member 58 is pivotally attached to a crank 59 through the medium of an offset connecting member 60. The crank 59 is keyed or otherwise rigidly attached to the crank shaft 29.

The details in the construction of the connecting member 58 are best illustrated in Fig. 9, where this member is shown as comprising an internally threaded thimble 65 provided with an apertured ear 66, whereby the member 58 is attached to the lever 55 by the pin 57, and which receives the lower end portion of an externally threaded sleeve 67. The sleeve 67 has a shoulder 68 formed in its lower end, such shoulder being adapted to act as an abutment for a washer 69 which is mounted on the lower end of a pin 70 and is retained thereon by means of a nut 71. The pin 70 is secured in the lower end portion of a rod 72 which slidably extends into the threaded sleeve 67. The upper end portion of the rod 72 is provided with a shoulder 73 which is formed below the bearing member 74 through which the rod 72 is connected to the offset connecting member 60 (Fig. 5) by means of pins 75. The rod 72 is yieldably held against sliding movement within the sleeve 67 by means of a compression spring 76 which is interposed between the shoulder 73 and an internally threaded split collar 78 mounted on the outer surface of the sleeve 67. From this construction it will be seen that the connecting member 58 may be yieldably compressed, such compression being for the purpose of permitting a continued movement of the crank 59 after the core 47 has reached the limit of its downward movement. The purpose of this construction will be best understood from the following description of the rotary table and the operation of the core member. Suffice to say at this time that it is important for the most satisfactory operation of a machine of this character that the core be held in the mold under pressure and rotated therein over a limited period after it reaches the bottom of its stroke. The compression of the connecting member 58, as mentioned above, permits this operation.

Reference numeral 80 indicates a rotary table which is mounted upon the upper end of a vertical shaft 81, the latter member having its lower end portion situated in a bearing 82 mounted on the base member 12 and its upper end portion in a bearing 83 which is contained within a vertical shaft housing 84. The rotary table 80 contains a plurality of (3) molds which are generally indicated by reference numeral 85, and are shown as being in the form of cups having flanges 86 formed at their upper ends whereby they are held against downward movement through suitable apertures provided in the table. It will be understood, of course, that the size and shape of these molds may be varied to suit the article which is to be formed by the machine, similar variations being made in the core 47. Each of the molds is shown as having a false bottom 88, such false bottom being provided with downwardly projecting stems 89, the stem extending through bearings 90 which are supported by downwardly extending brackets 91. This construction permits the extracting of the article formed in the mold simply by pushing the stems and the false bottoms upwardly through the molds after the articles have been formed.

The movement of the stems 89 and the consequent extraction of the article from the mold is accomplished through the medium of an extracting lever generally indicated by reference numeral 95, and shown as being mounted upon a pivot shaft 96 which is supported by suitable bearing plates 97 formed upon the base member 12. The outer end portion of the extracting arm or lever 95 is provided with a shoe 98 which is situated so as to engage the lower end portion of one of the extracting stems 89 when another of the molds is situated below the core 47. The extracting arm or lever 95 is operated by a connecting rod 99 which has its lower end pivotally attached to one end of the lever 95, as indicated at 100, and has its upper end portion pivotally attached to the offset connecting member 60, as clearly illustrated in Fig. 5, by reference numeral 101.

It will be seen from the construction so far described that when the core 47 is being moved downwardly into the mold situated below the same, the shoe 98 on the outer end of the extracting lever 95 is being raised, since both the extracting lever control rod 99 and the connecting rod 58 which controls the core reciprocating mechanism, are operated by the same crank on the crank shaft 29.

The intermittent rotation of the shaft 81 and the consequent intermittent rotation of the table 80 is effected through the medium of a table rotating shaft 105, such shaft being carried by bearings 106, 106′ and 107 in the standards 14 and 13 and the vertical shaft housing 84, respectively. The movement of the shaft 105 is accomplished by a ratcheting organization generally indicated by reference numeral 108. This organization is operated by a connecting rod 109, the upper end portion of which is attached to a crank 110 which is also keyed to the crank shaft 29.

The details in the construction of the ratchet organization 108 are best illustrated in Fig. 6 and the operation of this organization is clearly illustrated in Figs. 6A to 6D, inclusive. The ratchet organization 108 consists of a ratchet wheel 115, which is keyed to the shaft 105, and a secondary ratchet wheel 116 which is freely rotatable upon the shaft 105. The rotation of the ratchet wheel 116 upon the shaft 105 is retarded by means of a plurality of spring pressed frictional pins indicated at 117. The movement of the ratchet wheel or the ratchet wheels, as the case may be, is effected through the medium of a pawl member 120 which is pivotally attached to the lower end of the connecting rod 109, as indicated at 121. This pawl member is pivotally mounted between pawl plates 122 and 122′ upon a transverse pin 123 and a spring pressed stop pawl 124 is mounted upon a pin 125 connecting the ends of the plates opposite to which the pawl member 120 is attached. The stop pawl 124 is adapted to prevent the shaft 105 and its associated parts, including the table 80, "running ahead" of the ratchet.

It will be noted from Fig. 7 that the pawl member 120 and the stop pawl 124 are made of substantially the same width as the ratchet wheel 115, which is rigidly attached to the shaft 105 and, as shown in Fig. 7, these pawl members are held away from the pawl plate 122′ by means of spacing washers 126 and 127.

It will also be noted from Fig. 6 that the ratchet wheel 115 is provided with four notches of equal depth and the ratchet wheel 116 is provided with two notches having the same depth as the notch on the wheel 116 and with another pair of notches which are of a depth such that the inner surfaces of these notches clear the periphery of the wheel 115. It is through the use of this construction that we provide a mechanism whereby the machine may be adjusted so as to rotate the table only once for every two reciprocations of the core member. In other words, this construction permits the table being held stationary while the core member reciprocates a plurality of times. In the operation of this device when it is desired that the table be advanced after each movement of the core into one of the molds, the pawls 120 and 124 are set in the manner indicated in Fig. 7. When set in this manner the pawl 120 will engage one of the notches 130 on the ratchet wheel 115 for each reciprocation of the rod 109. The arrangement of the crank 110 with respect to the crank 59 is such that this engagement between the pawl 120 and the notch 130 will not take place until the core 47 has been lifted from the mold which is situated therebelow. If it is desired that each article in the mold be subjected to a double action of the core 47, the spacing washers 126 and 127 are removed and placed on the opposite sides of the respective pawls 120 and 124. When arranged in this manner, the parts occupying the position shown in Fig. 6, the continued upward movement of the rod 109 will carry the ratchet wheel 115 upwardly through 90° so that the shallow notch 132 on the freely rotating ratchet wheel 116 will be brought to the position occupied by the deep notches 130 and 131 in the wheels 115 and 116. During the next reciprocation of the rod 109 the pawl 120 will engage the shallow notch 132 and through such engagement will be rotated clear of the ratchet wheel 115. In this manner the shaft 105 receives no movement from this reciprocation of the rod 109, and since the remainder of the machine continues to operate in the usual manner, the article in the mold is subjected to two actions of the core 47 before the table is next rotated. In view of the fact that the reciprocation of the core member 47 and the partial rotation of the table 80 must be effected during one complete rotation of the crank shaft 29, it is important that the ratchet organization 108 be constructed so that the ratchet wheel or the ratchet wheels receive movement over a fraction (substantially 90°) of the complete movement of the crank shaft 29. This is the main reason for pivotally mounting the pawl 120 between the pawl plates 122 and 122', and the action of this mechanism is clearly illustrated in Figs. 6A to 6D, inclusive. Fig. 6A shows the position of the pawl 120 at the bottom of the stroke of connecting rod 109. It will be seen that the pawl has a substantial movement before it is brought into active engagement with the ratchet wheel 115. With the continued upward movement of the rod 109 in the direction of the arrow A, the pawl 120 is brought into engagement with the notch 130 in the ratchet wheel, as illustrated in Fig. 6B. The further upward movement of the rod 109 rotates the ratchet wheel around to the position shown in Fig. 6C, such rotation being effective to rotate the vertical shaft 81 through the medium of differential gears 81', a distance sufficient to carry the next mold beneath the core 47. The position shown in Fig. 6C is the position occupied by the members when the rod 109 has been moved to the completion of its up stroke. The initiation of the downward movement of the rod swings the pawl 120 into the position shown in Fig. 6D and carries the pawl plates 122 and 122' downwardly into the first position shown in Fig. 6A.

It was mentioned in the fore part of the specification as one of the objects of this invention, to provide means for locking the table against rotation while a mold was held beneath the core. Such locking means are indicated generally by reference numeral 135, the locking means 135 consisting of a sliding pin or bar 136 which is contained within a suitable bearing member 137 shown as having ears projecting inwardly above and below the table 80, such ears being indicated by reference numerals 138 and 138'. The table 80 is provided with a series of notches 139, each of which is situated opposite one of the molds 85, and is adapted for the reception of the inner end of the bar or pin 136. The outer end of the pin 136 is attached, through the medium of a pin and slot mechanism, to the downwardly projecting arm 140 of a bell crank 141. This crank is pivotally supported by a bearing member 141', which is mounted upon the standard 13. The movement of the bell crank 141 is effected through the medium of a connecting rod 142 which has its upper end attached to the outer end of a lever 143 which is pivoted to the top plate 15, as indicated by reference numeral 144. The lever 143 is situated so as to be engaged by the outer end of the crank 59 in the manner illustrated in Fig. 5. The weight of the connecting rod 142 and its associated parts is sufficient to normally maintain the bar or pin 136 toward an inwardly extending position, and it will be seen from the construction so far described, and as is clearly illustrated in Fig. 10, that the movement of the crank 59 upwardly to a position after which the core 47 has been removed from the mold, is effective to raise the lever 143 and unlatch the table 80, so that the continued movement of the crank 29 and the consequent engagement of the pawl 120 with the ratchet wheel 116, is effective to rotate the table 80 into the next position. It will also be apparent that after the crank 59 has advanced substantially 90° from the position shown in Fig. 10, that the lever 143 will drop back to its normal position, placing sufficient weight upon the bell crank 141 to force the pin 136 into the notch 139 when the table has been moved to a point at which such notch is opposite the pin. Also, it should be noted that the position of the crank 110 with respect to the crank 59 is such that the racking action of the table illustrated in Figs. 6B and 6C, is imitated just after the lever 59 reaches the position shown in Fig. 10.

It will be seen from this construction that the mechanism for rotating and locking the table and the mechanism for reciprocating the mandrel are so tied together or correlated that all of the parts are arranged in the proper position with respect to each other at the proper time. In other words, the core 47 is always out of the mold when the table is to be rotated and a mold is always situated beneath the core when the core is being advanced downwardly toward the table.

For the purpose of counterbalancing the core 47, we attach a flexible member 147 to the upper end of the sleeve 42, as indicated at 148. This member extends over pulleys 149 and 150 which are supported by the standards 13 and 14, respectively, and has a weight 151 attached to its lower end.

Reference numeral 152 indicates a braking device provided for the purpose of holding the table against any rotative movement other than that which is imparted to it by the racking mechanism. This braking device is shown as comprising a shoe 153 which has a boss 154 on its upper surface projecting into an aperture formed in the member 138. The shoe is held in pressure engagement with the edge of the table by a compression spring 155 which is retained in the aperture by a plug 156.

In order that the downward travel of the core member and the consequent thickness of the clay in the mold may be controlled to any desired extent, we provide the core member with a stop 160 which may be set to engage the upper surface of housing 35 when the core member has reached a predetermined point in its downward travel.

It will be apparent from the foregoing description that the device contemplated by this invention is of simple form and construction, may be economically manufactured, and is entirely automatic in its operation.

It is to be understood that while we have herein described and illustrated one preferred form of our invention, the invention is not limited to the precise construction described above, but includes within its scope whatever changes fairly come within the spirit of the appended claims.

We claim as our invention:

1. An automatic molding machine embodying: a rotary table; a plurality of molds in said table; a core member positioned above said table for intermittent movement into said molds; rack means for reciprocating said core member; means for intermittently rotating said table; and a friction brake for retarding the movement of said table.

2. An automatic molding machine embodying: a rotary table; a plurality of molds in said table; a core member positioned above said table for intermittent movement into said molds; rack means for reciprocating said core member; means for intermittently rotating said table; releasable locking means for holding said table against movement when one of said molds is in coaxial relation with said core; and a friction brake for retarding the movement of said table.

3. An automatic molding machine embodying: a rotary table; a plurality of molds in said table; a core member positioned above said table for intermittent movement into said molds; rack means for reciprocating said core member; ratchet means for intermittently rotating said table; and means for adjusting said ratchet means so that said core member is reciprocated a plurality of times for each intermittent rotation of said table.

4. An automatic molding machine embodying: a rotary table; a plurality of molds in said table; a frame; a reciprocable core support in said frame; a core on the lower end of said support in coaxial relation with one of said molds; means for reciprocating said core comprising a rack on said core support, a gear engaging said rack, lever means for imparting reverse rotation to said gear, and crank means for operating said lever; ratchet means for intermittently rotating said table; and power means for operating both said crank means and said ratchet means.

5. An automatic molding machine embodying: a rotary table; a plurality of molds in said table; means for intermittently rotating said table; a frame; a reciprocable core support in said frame; a core on the lower end of said support in coaxial relation with one of said molds; means for reciprocating said core comprising a rack on said core support, a gear engaging said rack, lever means for imparting reverse rotation to said gear, and crank means for operating said lever, said crank means including a yieldable member adapted to permit a continued movement of said crank when said core has reached the bottom of its stroke; ratchet means for intermittently rotating said table; and power means for operating both said crank means and said ratchet means.

6. An automatic molding machine embodying: a rotary table; a plurality of molds in said table; means for intermittently rotating said table; a lock for holding said table against rotation; a frame; a reciprocable core support in said frame; a core on the lower end of said support in coaxial relation with one of said molds; means for reciprocating said core comprising a rack on said core support, a gear engaging said rack, lever means for imparting reverse rotation to said gear, and crank means for operating said lever; means operated by said crank for releasing said table lock; ratchet means for intermittently rotating said table; and power means for operating both said crank means and said ratchet means.

7. An automatic molding machine embodying: a rotary table; a plurality of molds in said table; means for intermittently rotating said table; a lock for holding said table against rotation; a frame; a reciprocable core support in said frame; a core on the lower end of said support in coaxial relation with one of said molds; means for reciprocating said core comprising a rack on said core support, a gear engaging said rack, lever means for imparting reverse rotation to said gear, and crank means for operating said lever; means comprising a lever operated by said crank, a bell crank associated with said lock, a connecting means between said lever and said bell crank for releasing said lock; ratchet means for intermittently rotating said table; and power means for operating both said crank means and said ratchet means.

8. An automatic molding machine embodying: a frame; a drive shaft in said frame; a crank shaft in said frame adapted for rotation by said drive shaft; a bracket on said frame; a vertical sleeve reciprocably mounted in said bracket; rack means operated by said crank shaft for reciprocating said sleeve; a spindle rotatably mounted in said sleeve; means associated with said drive shaft for rotating said spindle; a core on the lower end of said spindle; a rotatable table below said core; a plurality of molds in said table; means for intermittently rotating said table to bring said molds successively below said core; and ratchet means operated by said crank shaft for actuating said table rotating means while said core is above said table.

9. An automatic molding machine embodying: a frame; a drive shaft in said frame; a crank shaft in said frame adapted for rotation by said drive shaft; a bracket on said frame; a vertical sleeve reciprocably mounted in said bracket; rack means operated by said crank shaft for reciprocating said sleeve; a spindle rotatably mounted in said sleeve; means associated with said drive shaft for rotating said spindle; a core on the lower end of said spindle; a rotatable table below said core; a plurality of molds in said table; means for intermittently rotating said table to bring said molds successively below said core; an extractor intermittently operated by said crank shaft for removing articles from one of said molds while another mold is beneath said core; and ratchet means operated by said crank shaft for rotating said table while said core is above said table.

10. An automatic molding machine embodying: a frame; a drive shaft in said frame; a crank shaft in said frame adapted for rotation by said drive shaft; a bracket on said frame; a vertical sleeve reciprocably mounted in said bracket; rack means operated by said crank shaft for reciprocating said sleeve; a spindle rotatably mounted in said sleeve; means associated with said drive shaft for rotating said spindle; a core on the lower end of said spindle; a rotatable table below said core; a plurality of molds in said table; means for intermittently rotating said table to bring said molds successively below said core; a lock for holding said table against rotation during the movement of said core into a mold; releasing means operated by said crank shaft for releasing said lock when said core has been withdrawn from a mold; and ratchet means operated by said crank shaft for rotating said table while said core is above said table.

11. An automatic molding machine embodying: a frame; a drive shaft in said frame; a crank shaft in said frame adapted for rotation by said drive shaft; a bracket on said frame; a vertical sleeve reciprocably mounted in said bracket; rack means operated by said crank shaft for reciprocating said sleeve; a spindle rotatably mounted in said sleeve; means associated with said drive shaft for rotating said spindle; a core on the lower end of said spindle; a rotatable table below said core; a plurality of molds in said table; means for intermittently rotating said table to bring said molds successively below said core; a lock for holding said table against rotation during the movement of said core into a mold; releasing means operated by said crank shaft for releasing said lock when said core has been withdrawn from a mold; an extractor operated by said crank shaft for removing articles from said molds while said table is locked against movement; releasing means operated by said crank shaft for releasing said lock when said core has been withdrawn from a mold; and ratchet means operated by said crank shaft for rotating said table while said core is above said table.

12. An automatic molding machine embodying: a rotary table; a plurality of molds in said table; a frame; a reciprocable core support in said frame; a core on the lower end of said support in coaxial relation with one of said molds; means for reciprocating said core comprising a rack on said core support, a gear engaging said rack; lever means for imparting reverse rotation to said gear, and crank means for operating said lever; and means for intermittently rotating said table.

13. An automatic molding machine embodying: a rotary table; a plurality of molds in said table; a core member positioned above said table for intermittent movement into said molds; means for reciprocating said core member; means for intermittently rotating said table; and a friction brake for retarding the movement of said table.

14. An automatic molding machine embodying: a rotary table; a plurality of molds in said table; a core member positioned above said table for intermittent movement into said molds; means for reciprocating said core member; ratchet means for intermittently rotating said table; and means for adjusting said ratchet means so that said core member is reciprocated a plurality of times for each intermittent rotation of said table.

In testimony whereof, we have hereunto set our hands at Los Angeles, California, this 20th day of November, 1930.

FRANK Y. PEARNE.
WILLIAM McCLINTOCK.